March 15, 1960     C. B. FOSTER, SR     2,928,674

TOY ROCKING HORSE

Filed Oct. 13, 1958

INVENTOR
Chamberlain B. Foster, Sr.

BY
Diggins & LeBlanc
ATTORNEYS

United States Patent Office 2,928,674
Patented Mar. 15, 1960

2,928,674
TOY ROCKING HORSE
Chamberlain B. Foster, Sr., Orchard Mobile, Ala.
Application October 13, 1958, Serial No. 767,016
7 Claims. (Cl. 272—53.2)

The present invention relates to new and useful improvements in toy rocking horses, and in particular to toy rocking horses which are capable of simulating various running gaits of a horse, down to and including a walk.

In presently known rocking horses which simulate the running of a horse, the length of the stride taken by the horse is almost entirely dependent upon the amount of bounce or rock that the child imparts to the rocking horse and no satisfactory means is provided for controlling the amount of the rocking motion. One other limitation of presently known rocking horses is that there are insufficient and unsatisfactory measures provided for preventing the child from rocking too hard and from being overthrown by the rocking horse.

Both of these shortcomings are overcome in the present invention by providing a means for limiting the amount of rocking motion that may be imparted to the rocking horse at any given time, while at the same time simulating various strides or gaits of the horse.

Accordingly, it is a primary object of the present invention to provide a rocking horse that is capable of simulating a particular gait of a horse with greater accuracy than has heretofore been possible.

It is another object of the present invention to provide a means for limiting the maximum amount of rocking motion that is possible for a toy rocking horse at any given time.

These and further objects and advantages of the present invention shall become apparent upon consideration of the following detailed description and drawing in which.

Figure 1:
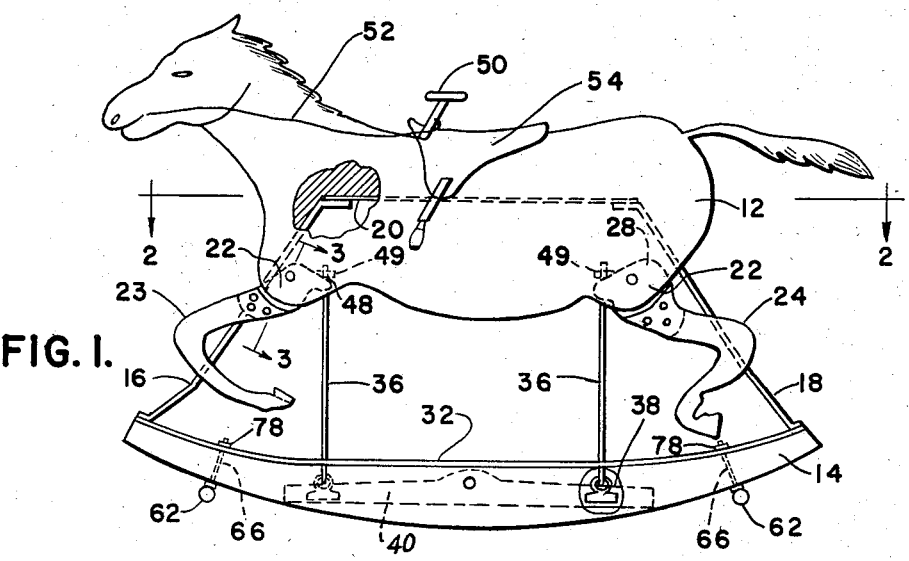
Figure 1 is a side elevational view partially in section of a hobby horse made in accordance with the present invention.

Referring now to Figure 1, a horse body is shown at 12 resiliently supported above a pair of parallel arcuate rockers 14 by a pair of front stiff leaf spring braces 16 and a pair of similar rear leaf spring braces 18. The leaf spring braces 16 and 18 are fixedly attached to a mounting plate 20 located within the horse body. The horse body 12 is shown to be solid above the mounting plate 20 and hollow beneath, and any suitable means may be employed to attach the horse body 12 to the mounting plate 20. The leaf spring braces 16 and 18 are preferably made of stiff spring steel. The horse body 12 may be of wood, aluminum, plastic or other suitable material.

Figures 3, 4, 5:
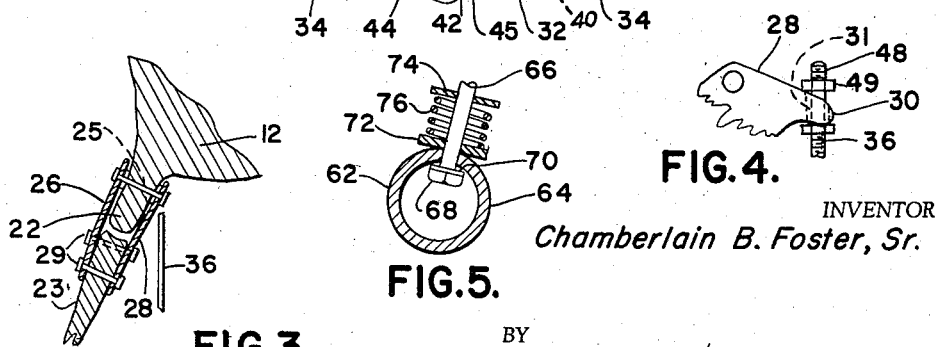
Figure 3 is a sectional view taken along the line 3—3 of Figure 1 showing the details of the leg assembly.
Figure 4 is a partial detail view of one of the brackets used on the inner side of the legs of the rocking horse.
Figure 5 is a cross-sectional view of one of the stoppers.

Four short leg projections 22, shown in section in Figure 3, are formed integral with the body 12. The fixed leg projections 22 are shown to extend downwardly and outwardly and are provided with movable front legs 23 and movable rear legs 24. The movable legs 23 and 24 are pivoted by bolt assembly 25 to the fixed leg projections 22 through an outer cover plate 26 and an inner bracket 28. The outer cover plate 26 and bracket 28 are secured to the legs by means of bolt assemblies 29.

A platform 32 extends across the top of the rockers 14 and makes it easier for the child to mount the rocking horse. Four slots indicated at 34 are provided in the platform 32 to permit four rods 36 to extend through the platform 32. The rods 36 are suspended from brackets 28 and Figure 4 shows the details of this suspension. The rods 36 are slidably received in bores 31 in lugs 30 on each of the brackets 28 and these lugs project towards the middle of the horse body 12. The lugs 30 may comprise thickened portions of brackets 28 or may comprise portions bent perpendicularly to the remainder of the brackets.

Figure 2:
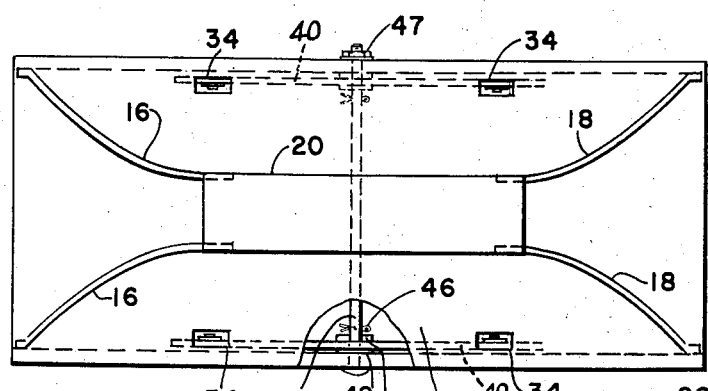
Figure 2 is a view taken along the line 2—2 of Figure 1 with the horse body removed and with certain parts broken away for purposes of clarity.

Reference is made to Figure 2 which shows that the striker plates 40 are spaced laterally inwardly of the rockers 14 by suitable spacers or washers 42 on a main bolt 44 which interconnects the arcuate rockers 14. The main bolt 44 is retained by any suitable means such as by a nut 47. Another spacer or washer is shown at 45 and a cotter pin or other retaining means is used at 46 to determine the inner position of the striker plate. The ends of the striker plates 40 are slightly above the ground or floor when the body 12 of the rocking horse is in the rest position shown in Figure 1.

The rods 36 are threaded at their upper ends as indicated at 48 of Figure 4 and are retained by nuts 49 so that the initial position of brackets 28 and legs 23, 24 may be determined. When the child causes the horse body 12 to rock in a forward direction, the front part of striker plates 40 contacts the ground causing the striker plates 40 to pivot in a clockwise direction about the main bolt 44. This motion is transmitted by way of rods 36 to cause counterclockwise rotation of each of the brackets 28. This, in turn, causes both the front legs 23 and the rear legs 24 to oscillate in a rearward direction. Conversely, when the child causes the horse body 12 to rock in a rearward direction, the rear part of striker plates 40 contacts the ground causing the striker plates 40 to pivot in a counterclockwise direction about the main bolt 44. This motion is again transmitted by way of rods 36 but this time to cause clockwise rotation of each of the brackets 28. This causes both the front legs 23 and the rear legs 24 to oscillate in a forward direction.

Since it is possible to vary the initial position of the brackets 28 and movable legs 23 and 24, the maximum forward swing of the front legs 23 and the maximum rearward swing of the rear legs 24 may be varied. Accordingly, it is possible to simulate various running gaits of a horse by adjusting the position of nuts 49 on the rods 36 and the noise of the four striker plate ends hitting the floor provides a realistic audible simulation of a running horse.

Referring now to Figures 1 and 5 the amplitude of rock of the horse is adjustably variable by means of stoppers 62. These stoppers consist of rubber or other resilient cylindrical members 64 which are apertured to receive bolts 66. The bolts 66 have heads 68 and washers 70 within the cylindrical members 64 and receive spaced washers 72 and 74 between the cylindrical members and rockers 14. Coil springs 76 are mounted between the washers 72 and 74 and provide a tension adjustable by means of nuts 78 which secure the stoppers to the rockers. By adjusting these nuts and the tension of the springs 76 it is possible to vary the amplitude of rock of the horse. The cylindrical members 64 may be four in number, with one mounted on each rocker end, or may be two in number and extend across both rockers.

The horse body 12 is also provided with a handle or holding bar 50 which the child may hold during the course of the ride. Alternatively, reins are provided at 52 for the child to hold. In either case, the child sits on a saddle indicated at 54 on the horse body 12.

It will be appreciated that by sloping the fixed leg projections 22 of the horse body 12 downwardly and outwardly, they will not interfere with the suspension of the striker plates 40 from the rod 36. Also the leaf spring braces 16 and 18 extend initially from their point of attachment to the rockers 14 rather severely towards the center of the horse body 12 so as not to interfere with the oscillatory motion of the legs 23 and 24.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A rocking horse comprising a pair of rockers, a horse body mounted above said rockers, a plurality of fixed leg portions extending downward from said body, a movable horse leg pivotally mounted to each of said fixed leg portions, a bracket fixedly mounted on each of said movable horse legs, a pair of striker plates spaced laterally inwardly of said pair of rockers, a plurality of rods fixed at one end to said striker plates, said plurality of rods having a sliding connection to said brackets at their other ends, said striker plates suspended by said rods and adapted to contact the ground upon a predetermined amount of rotation of said rocking horse.

2. A rocking horse as described in claim 1 wherein threaded means are provided on said rods to vary the initial position of said brackets and said movable legs so that various running gaits of a horse may be simulated.

3. A rocking horse comprising a pair of rockers, a plurality of leaf springs attached to each of said rockers, a horse body, a plate located within said horse body to which each of said leaf springs is attached to support said horse body above said rockers, a plurality of fixed leg portions formed integral with said body, a movable horse leg pivotally mounted to each one of said fixed leg portions, a bracket fixedly mounted on each one of said movable horse legs, a pair of striker plates spaced laterally inwardly of said pair of rockers, a plurality of rods fixed at one end to said striker plates, said plurality of rods having a sliding connection to said brackets at their other end, said striker plates suspended above the ground by said rods and adapted to contact the ground upon a predetermined amount of rotation of said rocking horse.

4. A rocking horse comprising a pair of rockers, a horse body mounted above said rockers, a plurality of downwardly and outwardly extending fixed leg portions formed integral with said body, a movable horse leg pivotally mounted to each one of said fixed leg portions, a bracket fixedly mounted on each one of said movable horse legs, a pair of striker plates spaced laterally inwardly of said pair of rockers, a plurality of rods fixed at one end to said striker plates, said plurality of rods having a sliding and pivotal connection to said brackets at their other end, said striker plates suspended above the ground by said rods and adapted to contact the ground upon a predetermined amount of rotation of said rocking horse.

5. A rocking horse comprising a pair of rockers, a horse body mounted above said rockers, movable horse legs pivotally mounted to said horse body, brackets fixedly mounted on each of said movable horse legs, a pair of striker plates spaced laterally inwardly of said pair of rockers, a plurality of rods attached at one end to said striker plates, said plurality of rods having a sliding connection to said brackets at their other ends, said striker plates suspended by said rods and adapted to contact the ground upon a predetermined amount of rotation of said rocking horse.

6. A rocking horse as described in claim 5 wherein threaded means are provided on said rods to vary the initial position of said attachment means and said movable legs so that various running gaits of a horse may be simulated.

7. A rocking horse comprising a pair of rockers, a plurality of leaf springs attached to each of said rockers, a horse body, a plate located within said horse body to which each of said leaf springs is attached to support said horse body above said rockers, movable horse legs pivotally mounted to said horse body, attachment means fixedly mounted on each of said movable horse legs, a pair of striker plates spaced laterally inwardly of said rockers, a plurality of rods attached at one end to said striker plates, said plurality of rods having a sliding connection to said attachment means at their other ends, said striker plates suspended above the ground by said rods and adapted to contact the ground upon a predetermined amount of rotation of said rocking horse.

References Cited in the file of this patent

UNITED STATES PATENTS

| 1,498,223 | Zsarnay | June 17, 1924 |
| 2,680,020 | Dwyer | June 1, 1954 |
| 2,727,741 | Fletcher | Dec. 20, 1955 |

FOREIGN PATENTS

| 327,847 | Germany | Oct. 18, 1920 |